US010769461B2

(12) United States Patent
Madkor et al.

(10) Patent No.: US 10,769,461 B2
(45) Date of Patent: Sep. 8, 2020

(54) DISTRACTED DRIVER DETECTION (71) Applicant: COM-IoT Technologies, Dubai (AE)

(72) Inventors: Ahmed Madkor, Dubai (AE); Youssra Elqattan, Dubai (AE); Abdarhman S. AbdElHamid, Dubai (AE)

(73) Assignee: COM-IoT Technologies, Dubai (AE)

( * ) Notice: Subject to any disclaimer, the term of this patent is extended or adjusted under 35 U.S.C. 154(b) by 0 days.

(21) Appl. No.: 16/220,908

(22) Filed: Dec. 14, 2018

(65) Prior Publication Data
US 2019/0188505 A1 Jun. 20, 2019

Related U.S. Application Data (60) Provisional application No. 62/598,799, filed on Dec. 14, 2017.

(51) Int. Cl.
G06K 9/00 (2006.01)
G06K 9/62 (2006.01)
B60W 40/09 (2012.01)
G08G 1/017 (2006.01)
G01S 5/00 (2006.01)
G06K 9/32 (2006.01)
G01S 17/00 (2020.01)

(52) U.S. Cl.
CPC ......... G06K 9/00845 (2013.01); B60W 40/09 (2013.01); G01S 5/0027 (2013.01); G06K 9/00785 (2013.01); G06K 9/3258 (2013.01); G06K 9/627 (2013.01); G06K 9/6274 (2013.01); G08G 1/017 (2013.01); G01S 17/00 (2013.01); G06K 2209/15 (2013.01)

(58) Field of Classification Search
CPC ............... G06K 9/00785; B60R 2300/105
See application file for complete search history.

(56) References Cited

U.S. PATENT DOCUMENTS

| 2009/0174573 | A1* | 7/2009 | Smith | G08G 1/0962 340/905 |
| 2011/0184895 | A1* | 7/2011 | Janssen | G06K 9/00818 706/12 |
| 2013/0054090 | A1* | 2/2013 | Shin | B60K 28/06 701/36 |
| 2016/0232415 | A1* | 8/2016 | L'Heureux | G06K 9/00 |
| 2018/0321758 | A1* | 11/2018 | Serban | B60J 5/047 |
| 2019/0137622 | A1* | 5/2019 | Lopez-Hinojosa | G01S 13/931 |

* cited by examiner

Primary Examiner — Fabricio R Murillo Garcia
(74) Attorney, Agent, or Firm — Erik A. Huestis; Stephen J. Kenny; Foley Hoag LLP (57) ABSTRACT Distracted driver detection is provided. In various embodiments, a video frame is captured. The video frame is provided to a trained classifier. The presence of a predetermined action by a motor vehicle operator depicted therein is determined from the trained classifier. An alert is sent via a network indicating the presence of the predetermined action and at least one identifier associated with the motor vehicle operator.

29 Claims, 7 Drawing Sheets

DISTRACTED DRIVER DETECTION

CROSS-REFERENCE TO RELATED APPLICATION

This application claims the benefit under 35 U.S.C. § 119(e) of U.S. Provisional Application No. 62/598,799, filed Dec. 14, 2017, which is hereby incorporated by reference in its entirety.

BACKGROUND

Embodiments of the present disclosure relate to distracted driver detection, and more specifically, to machine learning based systems for detecting driver distraction in live video feeds.

BRIEF SUMMARY

According to embodiments of the present disclosure, methods of and computer program products for distracted driver detection are provided. In various embodiments, a video frame is captured. The video frame is provided to a trained classifier. The presence of a predetermined action by a motor vehicle operator depicted therein is determined from the trained classifier. An alert is sent via a network indicating the presence of the predetermined action and at least one identifier associated with the motor vehicle operator.

DETAILED DESCRIPTION

Distracted driving contributes to a substantial number of motor vehicle accidents and injuries. For example, in the United States in 2015, 3,477 people were killed and 391,000 were injured in motor vehicle crashes involving distracted drivers. Moreover, in the United States in 2016, 3,450 people were killed in motor vehicle crashes involving distracted driving. According to some surveys, such as the 2015 National Survey on Distracted Driving Attitudes and Behaviors, cell phone use while driving is widespread (42% of drivers answer their cell phones at least some of the time when driving) although sending texts and/or emails is not as widespread (80% of respondents say they never text or email while driving) among drivers as talking on the cell phone while driving. While the proportion of respondents involved in car crashes or near-crashes has decreased slightly between 2010 and 2015, cell-phone-related motor vehicle crashes have increased considerably over the same time period. Lastly, the proportion of respondents stating that they were talking on the phone, sending or reading text messages or emails at the time of the crash has doubled between 2012 (6%) and 2015 (13%).

Distracted driving does not only include cell phone use while driving. Distracted driving may include any activity that diverts attention from driving, such as talking (e.g., to another passenger), texting, eating, drinking, using a stereo or other entertainment systems, or using a stand-alone navigation system. Texting is a particularly common distraction, with studies showing that upwards of 4% of drivers use handheld electronic devices while driving. While moving at 55 miles per hour, a vehicle moves 400 feet during a modest 5 second distraction, such as, for example, a distraction where a driver checks a text message.

Monitoring and enforcement of distracted driving rules are critical to public safety. Accordingly, there is a need for systems and methods for providing automated monitoring and detection of distracted driving in addition to alerting relevant authorities as to the location and nature of any infraction(s).

In various embodiments of the present disclosure, systems are provided that can detect whether the driver of a motor vehicle in the line of sight of a mounted camera and/or a Light Detection and Ranging (LIDAR) device is concentrating on driving related tasks or is distracted or otherwise driving unsafely. A driver can be distracted by using a cell phone for talking or texting as described above. The driver might also be drinking, eating, or self-grooming such as by adjusting hair/head scarf, applying makeup, or shaving. Other types of distractions include reaching behind the car seats. Solutions according to the present disclosure cover different types of distractions, are automated, are accurate, and deliver information in real-time.

Alternative solutions may detect cell phone usage from a fixed point, or detect other types of distraction from sensors inside the car. In-car systems are adapted for alerting a driver when their attention lapses. Such alternative solutions lack the automated processes described herein for detection of distracted driving and alerting police or other appropriate authorities.

The present disclosure enables the detection of driver behavior based on pre-defined actions, such as those described above.

In various embodiments, a LIDAR device may detect an incoming vehicle and provide digital 3D representations of the incoming vehicle, including positional data and velocity data, to a trained classifier at a remote server. In various embodiments, the velocity data includes a magnitude and a direction of travel. In various embodiments, the LIDAR device may detect the incoming vehicle at a range of 0 to 300 meters. In various embodiments, two or more LIDAR devices may be utilized to generate a higher resolution 3D representation of the incoming vehicle.

In various embodiments, a camera system may image the incoming vehicle when the vehicle enters the visual range of the camera and the image is provided to the trained classifier at the remote server. In various embodiments, the camera system may include a near infrared camera, a high-speed camera, and/or a suitable high resolution digital camera as is known in the art. In various embodiments, the camera may continuously record many frames in any suitable video format as is known in the art and one or more video frames may be provided to the trained classifier at the remote server. In various embodiments, the camera system may detect the incoming vehicle at a range of 0 to 40 meters. In various embodiments, two or more cameras may be utilized to image the incoming vehicle.

In various embodiments, the system may comprise a data uplink/downlink device, such as, for example, an antenna, a satellite dish, etc., for communicating with a network. In various embodiments, where the system is stationary, the system may be hard-wired directly to a wired network.

In various embodiments, at the remote server, a machine learning model is applied to video frames of drivers to detect such actions and provide an accurate, real-time analysis of the video showing the driver. The remote server may include any suitable machine learning model as is known in the art may be implemented to predict a type of vehicle, the location of an operator within the motor vehicle, and whether the operator is engaging in distracted driving or safe driving. In various embodiments, a machine learning model may be trained using one or more streams of data (e.g., video frames, 3D representation, positional information, and/or velocity data).

In various embodiments, the machine learning model may classify the motor vehicle as a car, bus, truck, van, tractor-trailer, and/or motorcycle. In various embodiments, the machine learning model may classify the motor vehicle operator's activity as safe driving; drinking; eating; looking left, right, or backwards; speaking to a passenger; grooming; hands on/off the wheel; and/or using a mobile device. In various embodiments, the machine learning model may classify the operator's driving as dangerous or safe. For example, when a vehicle is swerving, changing lanes too much, driving too fast, driving too slow, and/or driving in an improper lane, the system may classify this feature of the operator's driving as well.

In some embodiments, a pipeline of neural networks is applied. In an exemplary embodiment, a convolutional neural network is applied to incoming frames to detect a vehicle. Upon detection, a frame is provided to a second convolutional neural network for classification of the vehicle, driver, and/or behavior as described above. In some embodiment, a combined convolutional neural network is used for both detection and classification. In some embodiments, frames are preprocessed in order to adjust for weather conditions, fog, or low light. This preprocessing may be provided by another convolutional neural network that is trained to eliminate noise and normalize the images. Separately training these neural networks results may result in increased accuracy as compared to a single omnibus network. In some embodiments, preprocessing accomplished by application of normalization (e.g., contrast stretching) to arrive at a consistent image intensity range.

By collecting real-time data on driver and vehicle behaviors on the road, real-time alerts may be provided to relevant authorities. In this way, interventions are facilitated that can stop dangerous situations from turning into road accidents. In various embodiments, alerts are distributed to traffic regulators, to patrol cars, to other dispatchers, or stored for later action.

Figure 1:
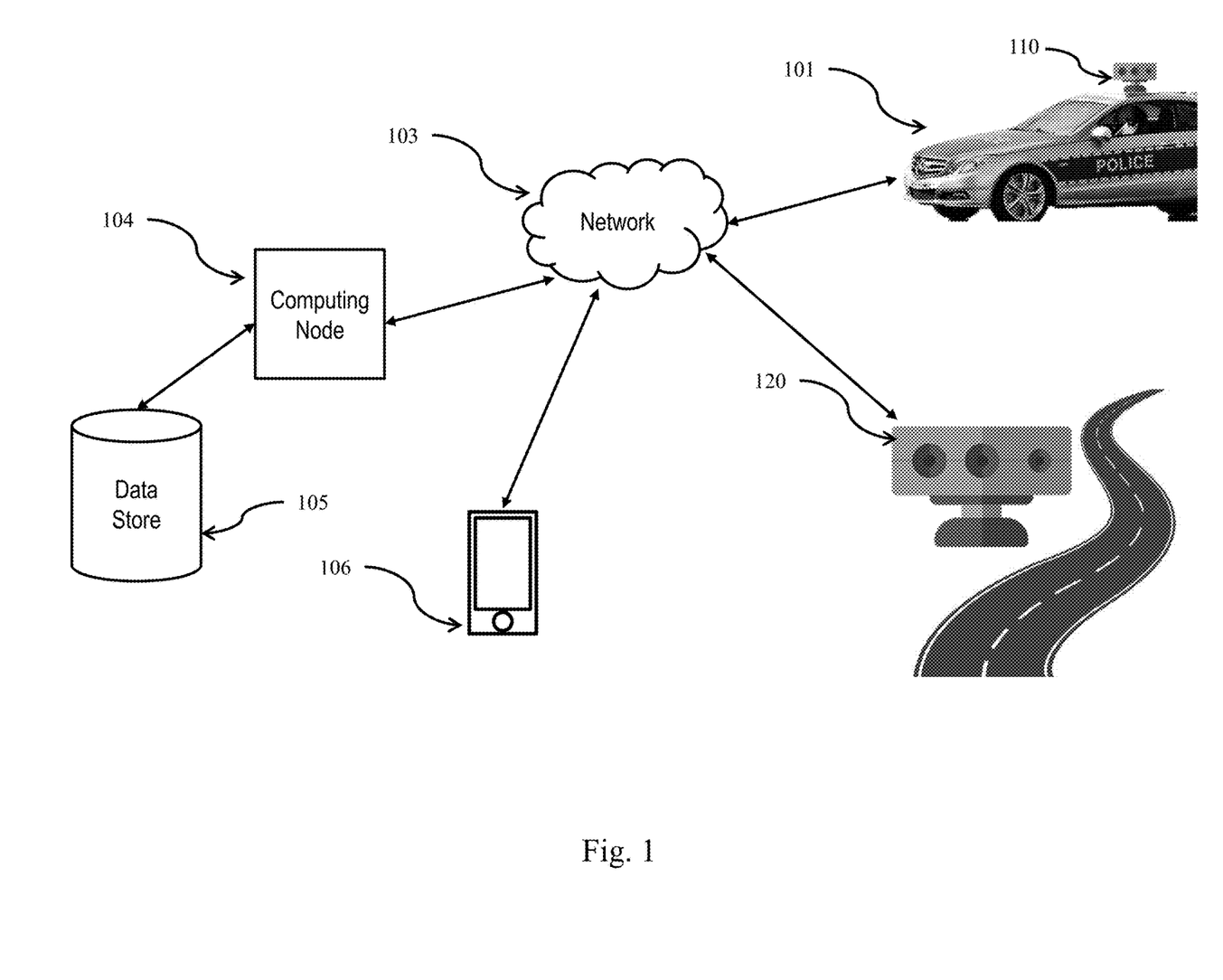
FIG. 1 illustrates an exemplary system for distracted driver detection according to embodiments of the present disclosure.

With reference now to FIG. 1, an exemplary system for distracted driver detection is illustrated according to embodiments of the present disclosure. In various embodiments, a connected, vehicle-integrated, mobile solution is mounted on motor vehicle 101. In various embodiments, one or more cameras 110 (and/or sensors) are mounted on the top of the vehicle 101. In various embodiments, the cameras 110 and/or sensors may point in any suitable direction from the vehicle (e.g., forward, reverse, and/or right/left side) to thereby capture video and/or sensor data of other vehicles (and vehicle operators) on the road. In various embodiments, a connected, fixed, road-side integrated solution is provided, mounted in a stationary casing 120 at roadside, which will be discussed in greater detail in FIG. 4.

Integrated sensor systems according to the present disclosure comprise a near-infrared camera to capture a video stream showing the vehicle and the driver. The video stream includes a plurality of video frames and one or more of the video frame may contain a depiction of the motor vehicle and/or the motor vehicle operator (i.e., the driver). The use of near-infrared allows for use in low-light conditions without the need for a visible-light illuminator, which can be a distraction to other drivers. In various embodiments, a high resolution digital camera may be used during daylight hours to capture video streams of motor vehicles and the operators. In various embodiments, integrated sensor systems include additional sensors such as LIDAR.

In various embodiments, the video stream is sent via network 103 to a remote computing node 104 for analysis. In various embodiments, the computing node 104 is a remote server. In various embodiments, to minimize data usage, specific video frames from the video stream are selected for transfer over the network 103. These specific video frames may be selected based on features, such as, for example, how much of the video frame contains a motor vehicle and/or the distance of the motor vehicle from the camera and/or sensors.

In some embodiments, all processing is performed at the edge (e.g., computing node 104 is collocated with 110). In such embodiments, just detected violations may be sent to a central node, so safe drivers are not sent. In this way, network traffic and logging of non-violators is minimized. In some embodiments, all videos and images are compressed to 30-70% of their original size to minimize bandwidth consumption. In some embodiments, live streaming from camera 110 is provided on demand, so video is not transmitted unless there's a request to do so.

In various embodiments, the video stream (and/or sensor data) is encoded at the location of capture, sent via the network 103, and decoded at the computing node 104. In some embodiments, the video is analyzed by a computing node located on vehicle 101 or in road-side device 102. As described above, the computing node 104 includes a machine learning model. The machine learning model may include a learning system, such as an artificial neural network, to classify features of the video frame as described in more detail above and below. Based on the video, license plate numbers may be detected. Similarly, distracted driving behaviors may be detected. In various embodiments, the make and/or model of the vehicle may be detected. In various embodiments, whether the headlights and/or any other vehicle lights (e.g., tail lights, turning signals, etc.) are on/off may be detected. In embodiments including LIDAR, speed and/or the 3D representation of the motor vehicle may be detected. The 3D representation may provide information such as estimated size and/or volume of the motor vehicle.

In various embodiments, where a license plate number is detected, the systems of the present disclosure may perform a lookup in a database to pull owner information associated with the particular vehicle (e.g., owner address, insurance, make, model, VIN, outstanding warrants, etc.).

In various embodiments, distracted driving behaviors are detected by a trained classifier. Such a classifier may be trained to locate a vehicle within each frame, identify the plate number of the vehicle, detect the location of the driver in each detected vehicle, and/or classify the action and behavior currently being performed by the detected driver.

Based on this detection, the action detected, the extracted plate number, and associated video may be extracted and sent for further processing or used to generate alerts. For example, in some embodiments, video and associated detections are stored in data store 105. In various embodiments, the data store 105 may be located at the same location (i.e., locally) as the computing node 104. In various embodiments, the data store 105 may be located at a different location than the computing node 104 (e.g., in cloud storage).

In some embodiments, video and associated detections are sent to mobile device 106 or another computing device as an alert. A user, such as a police officer, may then take appropriate action based on the alert. In various embodiments, the system may push alerts based on geographic location of users. In various embodiments, the system may send the alert to the closest user (i.e., the user having the shortest distance from the system). In various embodiments, the system may send the alert to a predefined subset of users (e.g., a specific group of on-duty police officers, and/or all police officers in a specific police precinct). In various embodiments, the system may send the alert to users within a predefined geographic range (e.g., all users within a 10 mile radius from the system). Alerts may also be sent via network 103 to various third-party systems. In various embodiments, the third-party system may include a message gateway that tracks the locations of police cars and/or officers. In various embodiments, the alert(s) may be logged into a database, such as database 105.

In various embodiments, any of the machine learning models described above may be a part of a learning system.

In some embodiments, the learning system include a naïve Bayes, principle component analysis (PCA), logistic regression, clustering, decision tree, random forest, and/or a reinforcement learning algorithm.

In some embodiments, a feature vector, including features such as those described above, is provided to a learning system. Based on the input features, the learning system generates one or more outputs. In some embodiments, the output of the learning system is a feature vector.

As mentioned above, in some embodiments, each frame is passed to a model that enhances its color, removes effects that may arise from bad weather, fog, or darkness and sharpens the image, so it's more clear to the authorities and the downstream models. The enhanced image is then supplied to a detection network and a classification network, or a combined detection/classification network.

In some embodiments, the learning system comprises a SVM. In other embodiments, the learning system comprises an artificial neural network. In some embodiments, the learning system is pre-trained using training data. In some embodiments training data is retrospective data. In some embodiments, the retrospective data is stored in a data store. In some embodiments, the learning system may be additionally trained through manual curation of previously generated outputs.

In some embodiments, the learning system is a trained classifier. In some embodiments, the trained classifier is a random decision forest. However, it will be appreciated that a variety of other classifiers are suitable for use according to the present disclosure, including linear classifiers, support vector machines (SVM), or neural networks such as recurrent neural networks (RNN).

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

Systems according to the present disclosure thereby provide Automatic Number Plate Recognition (ANPR) through the use of cameras to detect and identify the plate numbers of vehicles. Active video monitoring and automated plate recognition enables always-on monitoring and alerting for wanted or dangerous vehicles.

Some embodiments, include speed detection through the use of an additional sensor such as LIDAR. Accordingly, alerts may be generated upon detection of vehicles that are moving above the speed limit in order to improve traffic safety. In various embodiments, the one or more cameras may be turned on when the LIDAR detects an incoming vehicle to conserve energy use by the system.

In various embodiments, multiple modalities such as LIDAR, RGB images, and GPS location are fused to scan the environment around a vehicle or stationary device to identify the location of cars. Using a GPS sensor, the relative speed of other cars around the user can be accurately detected while identifying the cars that exceed a speed limit. Violations can be reported to a server for further action.

As set forth above, in various embodiments, distracted driver detection is provided. Drivers around the sensor system are detected and tracked. Driver distractions can be reported thereby. Video frames may be fed to a trained classifier, such as a deep neural network, to identify the presence of distracted behaviors. Distracted behaviors may be associated with a license plate number using the ANPR system.

In various embodiments, video streams may be streamed to a central location for operations and monitoring.

For stationary roadside embodiments, shoulder driving detection may be provided. By running for a short calibration period, sensor systems according to the present disclosure can automatically learn what the allowed regions for driving on the road are. Accordingly, alerts may be generated for vehicles that are driving in breach of the rules, which can include the shoulders or the chevrons.

Likewise, illegal lane change detection may be provided. Roadside sensors can track vehicles as they drive along the road, and detect the lane at every moment in time. By doing so, it can detect when a vehicle is making too many lane changes in a time period, or when the vehicle changes lanes abruptly without using the lane change indicators.

A microphone is included in various embodiments of the present disclosure. In this way, vehicles generating noise on the road may be detected. This also allows for the location of the vehicle generating the noise to be calculated. A violation can be generated by capturing a video segment of the vehicle passing with audio.

A weather station is included in various embodiments of the present disclosure to monitor weather conditions. By utilizing the weather station, change in the weather conditions can be detected, including changes in visibility due to, e.g., fog or sand storms. Weather information and alerts can then be sent to a central operations facility in real-time.

It will be appreciated that a variety of additional features may be deployed using the sensor systems of the present disclosure. For example, various smart city functionality may be deployed, such as parking management, smart trash collection, or municipal ordinance enforcement.

In various embodiments, cameras inside a parking lot are used to identify available parking spots using a trained machine learning system. The available spots, along with the camera unique ID may be used to determine the lot's GPS location and price options. This information may then be communicated to a mobile app or a website. This approach may be applied over multiple lots in a city, providing vehicle owners with as many parking options as they need, reducing traffic congestion and fuel usage.

In various embodiments, proximity sensors are provided inside a trash can. Upon reaching a predetermined threshold such as 85% full, an alert may be sent to the nearest trash truck in the vicinity so it can head straight to it and collect the trash. This approach, on a city-wide deployment, results in significant savings in terms of trash truck fuel usage as well as reducing traffic congestion.

In various embodiments, bicycle tracking is provided. In such embodiments, a machine learning system is trained to detect bicycles in video. Where a municipality prohibits the use of bicycles during certain hours on certain days, but allows wheel chairs and baby strollers at all times, such a system may be used to identify violations of local ordinance. Cameras detect bicycles (distinguished from other wheeled objects) and provide real-time reports, images, and video feeds of violations to enable authorities to take necessary action.

Figure 2:
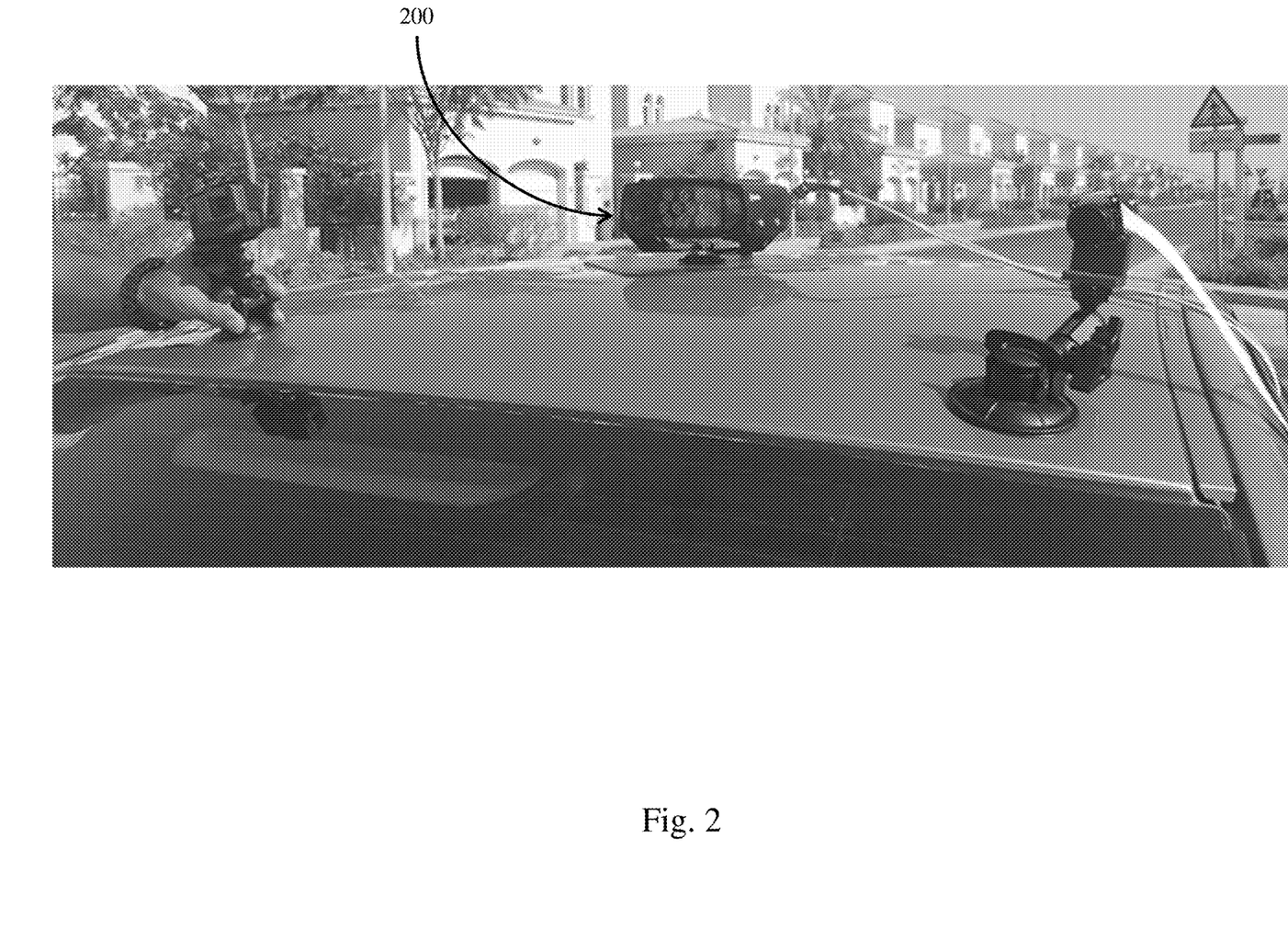
FIG. 2 depicts an exemplary rooftop mount for a camera system according to embodiments of the present disclosure.

Referring now to FIG. 2, an exemplary rooftop mount 200 for a camera system according to the present disclosure is depicted. The rooftop mount 200 may include one or more cameras housed therein for recording a video stream as described above. In various embodiments, more than one rooftop mount 200 may be mounted to the top of a car, where each mount includes a single camera or sensor. One or more additional cameras 210 may be mounted on the vehicle.

Figure 3A:
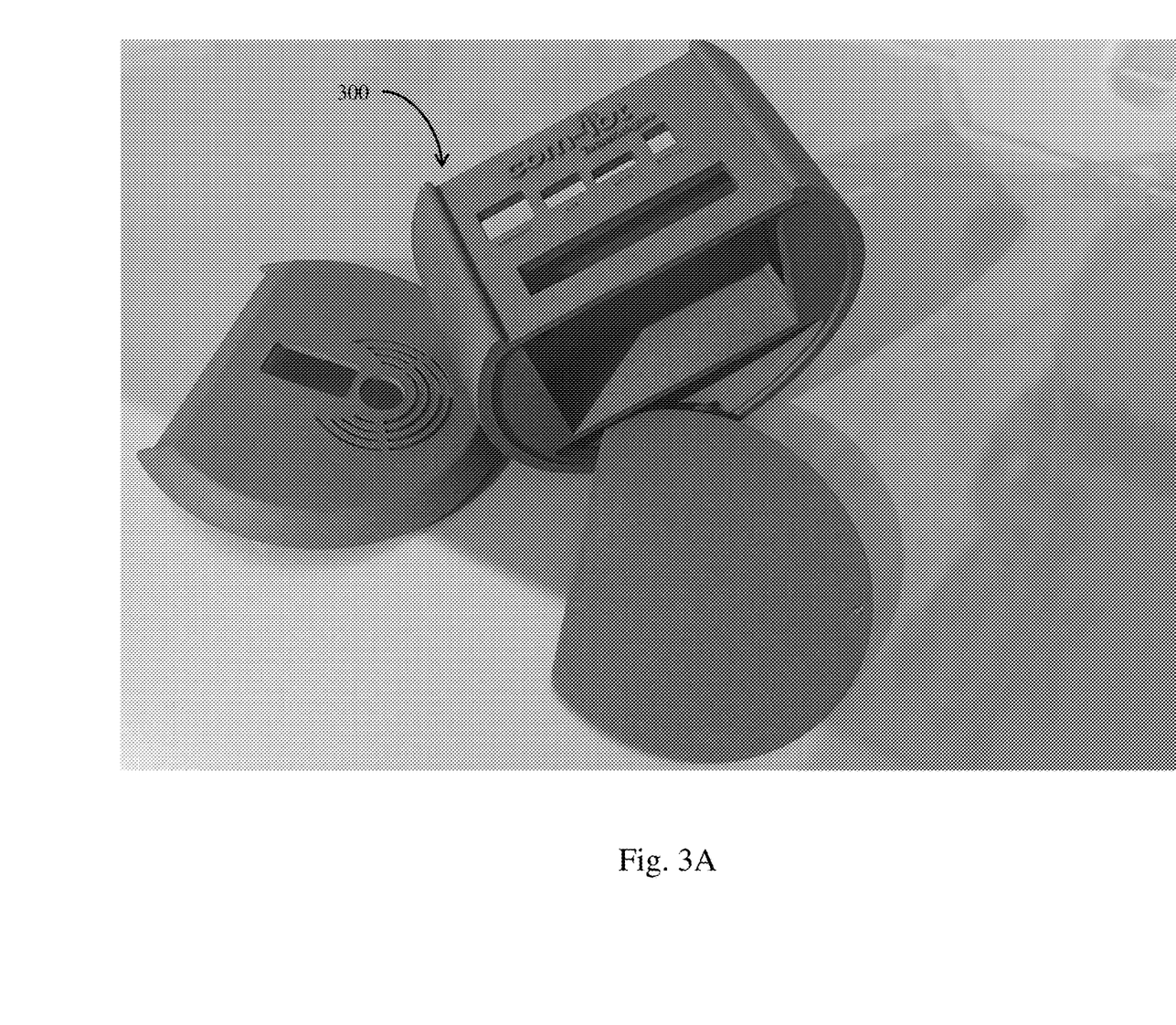
FIGS. 3A-3B depict an exemplary casing for a portable computing node according to embodiments of the present disclosure.
Figure 3B:
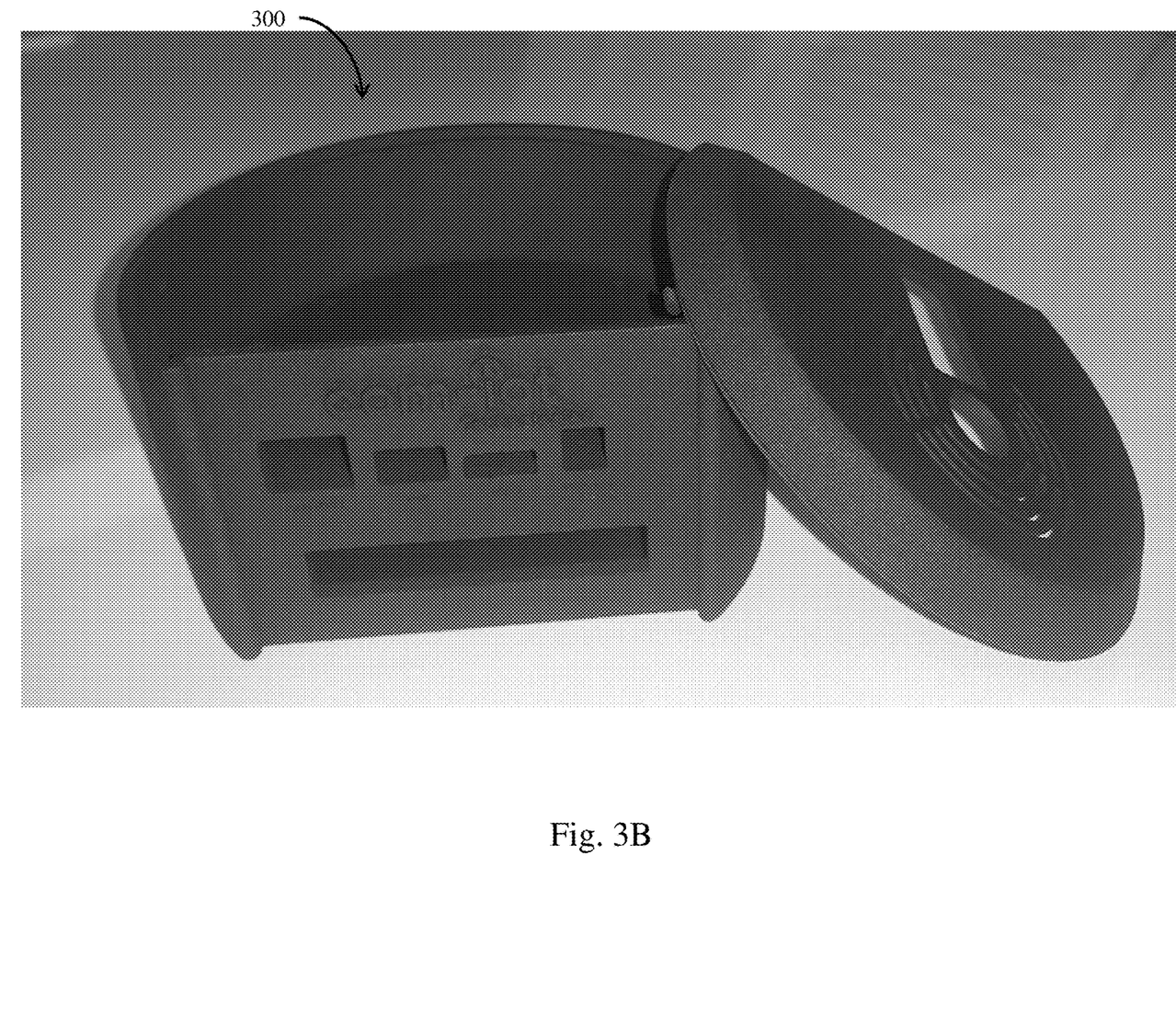

Referring now to FIGS. 3A-3B, an exemplary casing 300 for a portable computing node according to the present disclosure is depicted.

Figure 4:
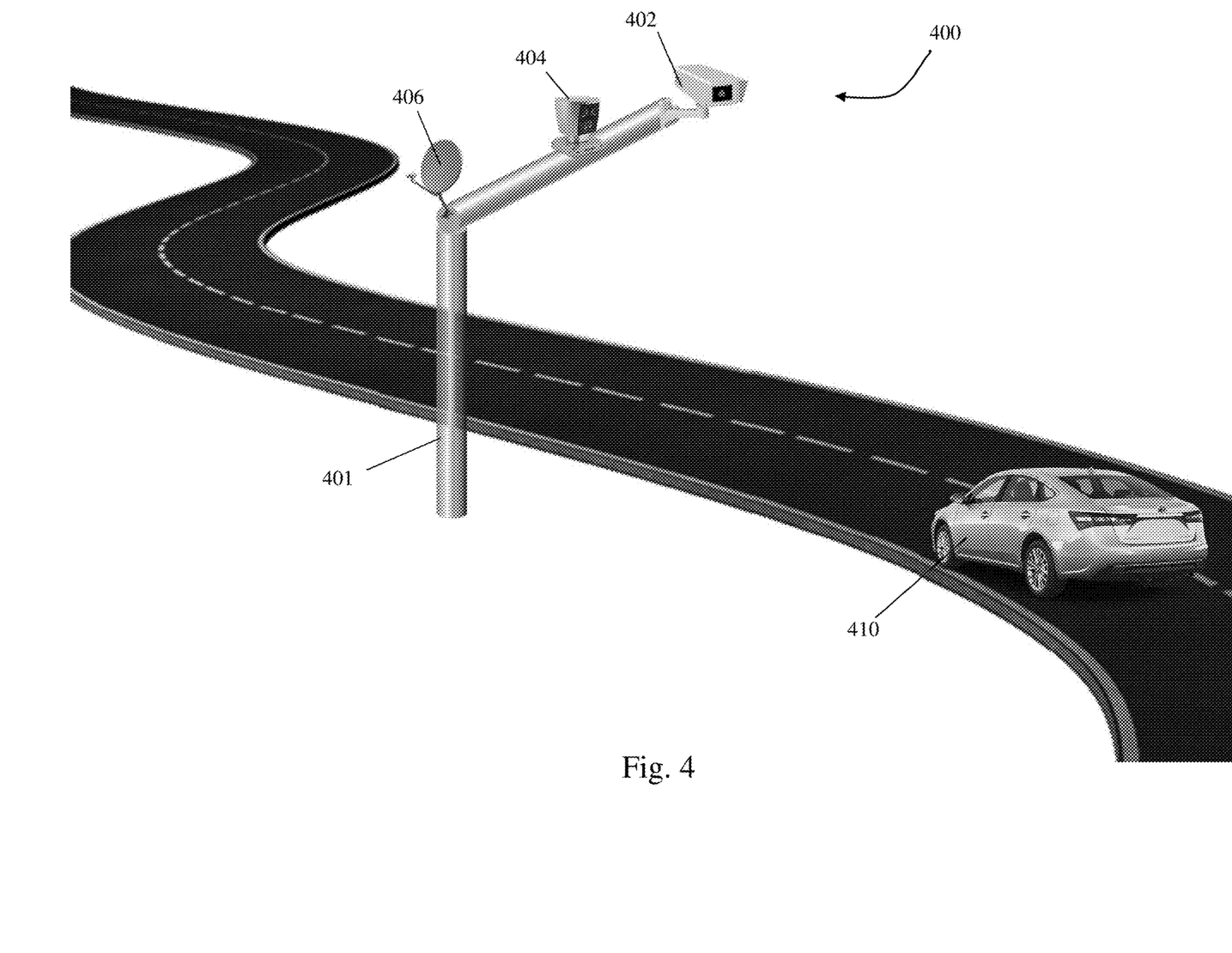
FIG. 4 illustrates an exemplary system for distracted driver detection according to embodiments of the present disclosure.

Referring now to FIG. 4, an exemplary stationary, roadside system 400 for distracted driver detection according to the present disclosure is depicted. The system 400 includes a stationary frame 401 having a camera system 402, a LIDAR system 404, and a satellite uplink/downlink 406 for communication with a network. In various embodiments, the system 400 may be hard-wired to a wired network, which may provide a higher bandwidth for transmitting video to the computing node. Road-side system 400 continuously records video of oncoming vehicles using one or more cameras in the camera system 402. Additionally, LIDAR data may be recorded for the oncoming vehicles via the LIDAR system 404. One or more video frames depicting a motor vehicle 410 and/or the vehicle operator are transmitted via the satellite uplink/downlink 406 to a computing node at a remote server running a machine learning model for classification of the operator activity. In various embodiments, if the operator is engaging in safe driving, no alert is generated. In various embodiments, if the operator is engaging in safe driving, an indication may be provided to one or more users that motor vehicle operators are driving safely.

Figure 5:
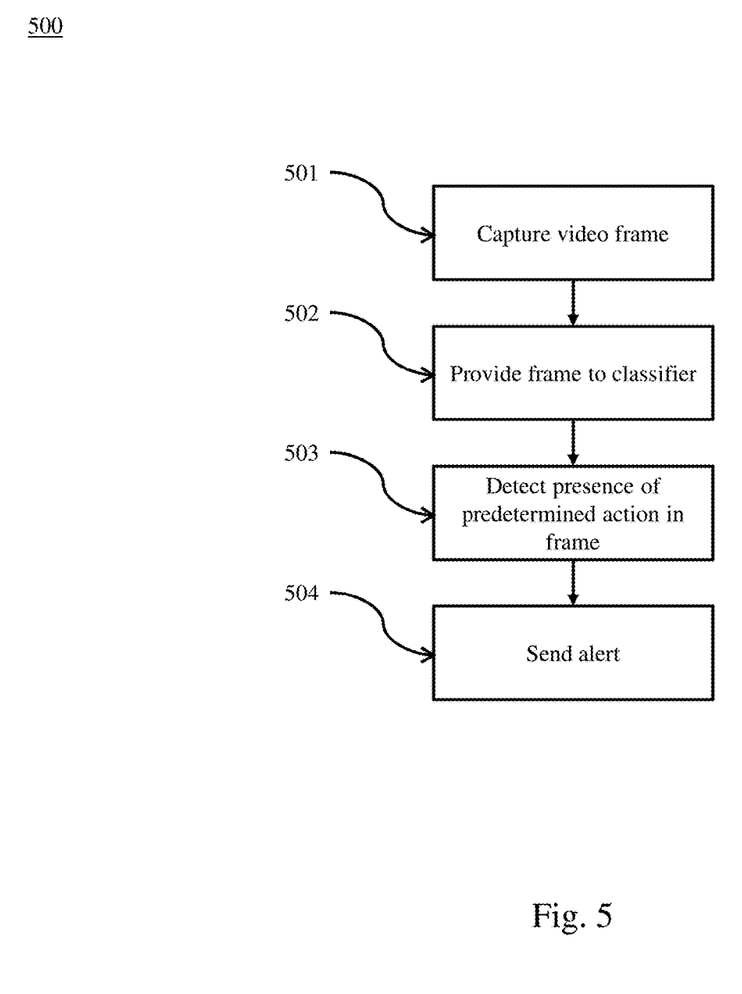
FIG. 5 illustrates a method of distracted driving detection according to embodiments of the present disclosure.

Referring now to FIG. 5, a method of distracted driving detection is according to embodiments of the present disclosure is illustrated. At 501, a video frame is captured. At 502, the video frame is provided to a trained classifier. At 503, the presence of a predetermined action by a motor vehicle operator depicted therein is determined from the trained classifier. At 504, an alert is sent via a network indicating the presence of the predetermined action and at least one identifier associated with the motor vehicle operator.

Figure 6:
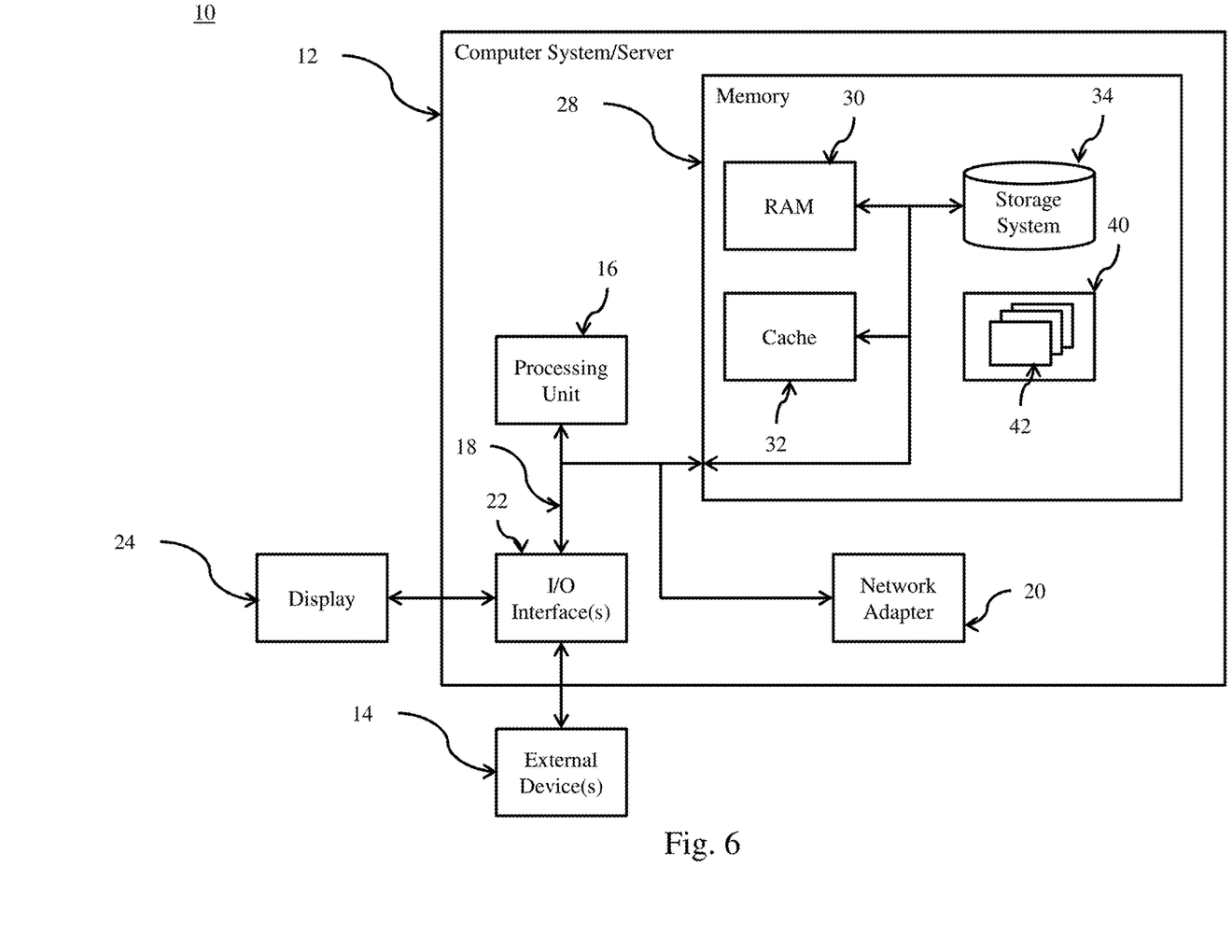
FIG. 6 depicts a computing node according to an embodiment of the present invention.

Referring now to FIG. 6, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    capturing a video frame from a near-infrared video camera, the video frame comprising a motor vehicle depicted within the video frame;
    capturing position information of the motor vehicle with a light detection and ranging (LIDAR) device;
    providing the video frame and position information to a trained classifier at a remote server via a network, wherein the provided video frame is compressed for transmission via the network and is selected to minimize data usage of the network based on how much of a motor vehicle is contained therein and the distance of the motor vehicle from the near-infrared video camera;
    determining, from the trained classifier, a type of the motor vehicle depicted within the video frame;
    determining, from the trained classifier, a location and a velocity of the motor vehicle depicted within the video frame, the velocity having a magnitude and a direction of travel;
    determining from the trained classifier a presence of a predetermined action by the motor vehicle; and
    based on the determined location, the velocity with the magnitude and direction of travel, and the predetermined action, sending an alert via the network indicating the presence of the predetermined action and at least one identifier associated with the motor vehicle.

2. The method of claim 1, wherein the predetermined action is selected from the group consisting of:
    safe driving;
    drinking;
    eating;
    looking left, right, or backwards;
    speaking to a passenger;
    grooming; and
    using a mobile device.

3. The method of claim 1, wherein the at least one identifier comprises a license plate.

4. The method of claim 1, wherein the at least one identifier comprises a geographical location.

5. The method of claim 1, wherein the alert is sent to a user having a shortest distance to a location of the video camera.

6. The method of claim 1, wherein the alert is sent to a plurality of users, each of the plurality of users being within a distance of a location of the video camera that is less than a predetermined threshold.

7. The method of claim 1, further comprising logging the alert in a database.

8. The method of claim 1, wherein the type of motor vehicle is selected from the group consisting of: car, bus, truck, van, tractor-trailer, and motorcycle.

9. The method of claim 1, wherein the trained classifier comprises an artificial neural network.

10. A system comprising:
    a near-infrared video camera;
    a light detection and ranging (LIDAR) device;
    a computing node comprising a computer readable storage medium having program instructions embodied with the computer readable storage medium, the program instructions executable by a processor of the computing node to cause the processor to perform a method comprising:
    capturing a video frame from the near-infrared video camera, the video frame comprising a motor vehicle depicted within the video frame;
    capturing position information of the motor vehicle with the LIDAR device;
    providing the video frame and position information to a trained classifier at a remote server via a network, wherein the provided video frame is compressed for transmission via the network and is selected to minimize data usage of the network based on how much of a motor vehicle is contained therein and the distance of the motor vehicle from the near-infrared video camera;
    determining, from the trained classifier, a type of the motor vehicle depicted within the video frame;
    determining, from the trained classifier, a location and a velocity of the motor vehicle depicted within the video frame, the velocity having a magnitude and a direction of travel;
    determining from the trained classifier the presence of a predetermined action by the motor vehicle; and based on the determined location, the velocity with the magnitude and direction of travel, and the predetermined action, sending an alert via the network indicating the presence of the predetermined action and at least one identifier associated with the motor vehicle.

11. The system of claim 10, where the system is mounted on an enforcement motor vehicle.

12. The system of claim 10, where the system is fixed to a ground.

13. The system of claim 10, wherein the predetermined action is selected from the group consisting of:
   safe driving;
   drinking;
   eating;
   looking left, right, or backwards;
   speaking to a passenger;
   grooming; and
   using a mobile device.

14. The system of claim 10, wherein the at least one identifier comprises a license plate.

15. The system of claim 10, wherein the at least one identifier comprises a geographical location.

16. The system of claim 10, wherein the alert is sent to a user having a shortest distance to a location of the video camera.

17. The system of claim 10, wherein the alert is sent to a plurality of users, each of the plurality of users having a distance, each distance being less than a predetermined threshold.

18. The system of claim 10, further comprising logging the alert in a database.

19. The system of claim 10, wherein the type of motor vehicle is selected from the group consisting of: car, bus, truck, van, tractor-trailer, and motorcycle.

20. The system of claim 10, wherein the trained classifier comprises an artificial neural network.

21. A computer program product for detecting distracted driving, the computer program product comprising a computer readable storage medium having program instructions embodied therewith, the program instructions executable by a processor to cause the processor to perform a method comprising:
   capturing a video frame from a near-infrared video camera, the video frame comprising a motor vehicle depicted within the video frame;
   capturing position information of the motor vehicle with a light detection and ranging (LIDAR) device;
   providing the video frame and position information to a trained classifier at a remote server via a network, wherein the provided video frame is compressed for transmission via the network and is selected to minimize data usage of the network based on how much of a motor vehicle is contained therein and the distance of the motor vehicle from the near-infrared video camera;
   determining, from the trained classifier, a type of the motor vehicle depicted within the video frame;
   determining, from the trained classifier, a location and a velocity of the motor vehicle depicted within the video frame, the velocity having a magnitude and a direction of travel;
   determining from the trained classifier the presence of a predetermined action by a motor vehicle depicted therein; and
   based on the determined location, the velocity with the magnitude and direction of travel, and the predetermined action, sending an alert via a network indicating the presence of the predetermined action and at least one identifier associated with the motor vehicle.

22. The computer program product of claim 21, wherein the predetermined action is selected from the group consisting of:
   safe driving;
   drinking;
   eating;
   looking left, right, or backwards;
   speaking to a passenger;
   grooming; and
   using a mobile device.

23. The computer program product of claim 21, wherein the at least one identifier comprises a license plate.

24. The computer program product of claim 21, wherein the at least one identifier comprises a geographical location.

25. The computer program product of claim 21, wherein the alert is sent to a user having a shortest distance to a location of the video camera.

26. The computer program product of claim 21, wherein the alert is sent to a plurality of users, each of the plurality of users having a distance that is less than a predetermined threshold.

27. The computer program product of claim 21, further comprising logging the alert in a database.

28. The computer program product of claim 21, wherein the type of motor vehicle is selected from the group consisting of: car, bus, truck, van, tractor-trailer, and motorcycle.

29. The computer program product of claim 21, wherein the trained classifier comprises an artificial neural network.

* * * * *